US012687435B2

(12) United States Patent
Retzlaff et al.

(10) Patent No.: US 12,687,435 B2
(45) Date of Patent: Jul. 21, 2026

(54) CALIBRATION AND MONITORING TOOL FOR THERMOCYCLER

(71) Applicant: STRATEC SE, Birkenfeld (DE)

(72) Inventors: Ruediger Retzlaff, Birkenfeld (DE); Bernd Groehbuehl, Birkenfeld (DE)

(73) Assignee: STRATEC SE, Birkenfeld (DE)

( * ) Notice: Subject to any disclaimer, the term of this patent is extended or adjusted under 35 U.S.C. 154(b) by 351 days.

(21) Appl. No.: 18/589,908

(22) Filed: Feb. 28, 2024

(65) Prior Publication Data

US 2024/0295442 A1 Sep. 5, 2024

(30) Foreign Application Priority Data

Mar. 1, 2023 (LU) .................................. LU103082

(51) Int. Cl.

| | |
|---|---|
| *G01K 1/024* | (2021.01) |
| *B01L 7/00* | (2006.01) |
| *G01K 1/02* | (2021.01) |
| *G01N 35/00* | (2006.01) |

(52) U.S. Cl.
CPC ................ *G01K 1/026* (2013.01); *B01L 7/52* (2013.01); *G01K 1/024* (2013.01); *G01K 2215/00* (2013.01); *G01N 2035/00366* (2013.01)

(58) Field of Classification Search
CPC .......... G01K 1/024; G01K 1/026; G01K 1/14; G01K 1/16; G01K 13/00; G01K 2007/422; G01K 2215/00; B01L 7/52; B01L 9/523; B01L 2200/147; B01L 2300/1805; G01N 2035/00366
See application file for complete search history.

(56) References Cited

U.S. PATENT DOCUMENTS

| | | | | |
|---|---|---|---|---|
| 6,762,049 | B2 * | 7/2004 | Zou ...................... | B01J 19/0093 |
| | | | | 435/7.1 |
| 11,953,382 | B2 * | 4/2024 | Künz ........................ | B01L 7/52 |
| 2006/0094108 | A1 * | 5/2006 | Yoder ..................... | B01L 3/508 |
| | | | | 435/293.1 |
| 2014/0036475 | A1 | 2/2014 | Gaines | |
| 2017/0266667 | A1 * | 9/2017 | Mortillaro ................. | B01L 7/52 |
| 2021/0041306 | A1 * | 2/2021 | Künz ..................... | G01K 1/026 |

FOREIGN PATENT DOCUMENTS

| | | | | |
|---|---|---|---|---|
| EP | 3772375 | A1 | 2/2021 | |
| JP | H04357460 | | * 12/1992 | |
| WO | WO-2018036895 | A1 * | 3/2018 | ............... B01L 7/52 |

OTHER PUBLICATIONS

Computer translation of JP_H04357460_A (Year: 2026).*
Luxembourg Search Report and Written Opinion for priority application LU103082 issued on Aug. 22, 2023.
Smith Deny; "An Overview for the PCB gold fingers", Style Vanity, Jul. 27, 2021, pp. 1-7. https://stylevanity.com/2021/07/an-overview-for-the-pcb-gold-fingers.html.
Anonymous; "How to Make a Round PCB Board within PCB Design Tools?", PCBBuy—Custom PCB Buy Online, Dec. 2, 2021, pp. 1-2. https://www.pcbbuy.com/news/How-to-Make-a-Round-PCB-Board-within-PCB-Design-Tools.html.

* cited by examiner

*Primary Examiner* — Randy W Gibson
(74) *Attorney, Agent, or Firm* — William Gray Mitchell

(57) ABSTRACT

A device for measuring a temperature, comprising a circular printed circuit board comprising a circular inner material comprising a controller, a power supply and a transmitter, and an outer material which is arranged radially around the circular inner material; and at least one thermal sensor which is arranged at the outer material of the circular printed circuit board.

10 Claims, 1 Drawing Sheet

CALIBRATION AND MONITORING TOOL FOR THERMOCYCLER

CROSS-REFERENCE TO RELATED APPLICATION

The present application claims priority to Luxembourg Patent Application No. LU 103082 filed on Mar. 1, 2023. The aforementioned application is hereby incorporated by reference in its entirety.

BACKGROUND OF THE DISCLOSURE

Field of the Disclosure

The disclosure relates to a device for calibration and monitoring during thermal cycling.

Brief Description of the Related Art

Devices for use in clinical diagnostics and life sciences are produced by a number of companies. For example, STRATEC® SE, Germany, manufactures numerous devices for diagnostic specimen handling and detection for use in automated analyser systems and other laboratory instrumentation.

Polymerase chain reaction (PCR) thermal cycling is a method for the amplification of specific DNA target sequences. The reaction solutions comprise a reaction buffer, enzymes, primer, and nucleotides. This mixture must undergo repeated changes of temperature to enable amplification of the desired DNA sequence. The repeated change of temperature is referred to as thermal cycling A quantitative analysis during PCR cycling may be achieved by measurement of fluorescence emission.

PCR thermal cyclers are widely used as laboratory stand-alone devices to amplify segments of DNA via the polymerase chain reaction. They usually have one thermal block with holes where single tubes, stripes of tubes, or micro plates holding reaction mixtures can be inserted.

Some of these commonly used heater blocks allow for performing thermal gradients over several tubes at a time. They however cannot treat each tube individually and are not suitable to perform different assays with individual timings and temperature profiles simultaneously.

Thermal cycling (heating/cooling) inside the devices is usually performed by thermos-electrical devices (Peltier elements) and with electrical (resistive) heaters. Only a few other cyclers use different approaches like hot or cool air, previous types of cyclers used several oil or water baths with different temperatures. Inductive heating of a metal ring or a surface which are in contact with the containers comprising the samples are also known from the prior art.

Published U.S. Pat. No. 5,601,141 describes a batch thermal cycler for large numbers of biological or chemical samples which uses n modules each in good thermal contact with the samples, but substantially isolated from one another, thermally and functionally. Each module carries samples on an upper sample plate. The module has a temperature sensor adjacent the samples, an electrical resistance heating element, and a circulating fluid heat exchanger for step cooling. Heating occurs at a point generally between the samples and the source of the cooling. The modules are individually replaceable. O-rings automatically seal fluid and electrical interfaces. An electrical controller has n simultaneous channels that provide closed loop control of the electrical power to each module. As a method, the disclosure includes at least one modular temperature zone where the temperature is sensed at a point adjacent the samples in that zone. The samples are heated adjacent the sample plate. Cooling is by a step change. The cooling overshoots a set lower temperature. A small, well-controlled heating corrects the overshoot.

Published U.S. Patent Application No. US 2004/033619 A1 discloses a heater module that includes a heat distribution plate including a bottom portion having first and second sides and a plurality of projections extending away from one of the sides. A heat source is provided for heating the heat distribution plate, and, optionally, a heating tray can be used to receive the heat source and heat distribution plate. The heater module is adapted to engage a sample purification tray having a plurality of purification and/or discharge columns which can extend through openings in the heater module and direct a sample into a sample receiving tray.

Published Chinese Patent Application No. 105505761 A describes a digital isothermal nucleic acid detecting device which comprises a micro-fluidic chip, a temperature control system and a pressure driving system. A microfluidic channel for microsphere forming and a reaction section for nucleic acid amplification are formed by the micro-fluidic chip through sequential laminating of a substrate layer, a channel layer arranged on the substrate layer and a cover plate layer arranged on the channel layer. The temperature control system comprises a lower press plate for applying pressure to the substrate from bottom to top and an upper press plate for applying pressure to the cover plate layer from top to bottom, and temperature sensing chips and temperature control heating elements for heating the reaction section are arranged in the upper press plate and the lower press plate. The pressure driving system is connected to the micro-fluidic chip and used for applying pressure to the channel layer in the micro-fluidic chip so that liquid to be detected can flow into the reaction section from the inflow end. According to the scheme, microsphere preparation and nucleic acid amplification and detection are integrated through the digital isothermal nucleic acid detecting device and the detection method, and the advantages of being high in sensitivity and the like are achieved.

Published Chinese Patent Application No. CN 101429560 A relates to a quantitative measuring device for polymerase chain reaction, wherein a heating unit used for supplying the temperature required by the PCR reaction, a microfluid unit used for loading and distributing biological sample solution and making the biological sample solution and DNA of a biological sample generate PCR reaction, and a measuring unit used for acquiring electrical signals of the DNA amplified yield are integrated into three modules, and the three modules are connected with each other by adopting an overlaid structure and aligned to each other. The preparation process of the preparation method is to utilize the micro-nano processing technology to integrate the three units into three different chips, to package the chips and arrange the chips in different packaged sockets, and to finally connect the packaged sockets by adopting a flip-shell structure by means of overlapping. The quantitative measuring device for the polymerase chain reaction reduces the difficulty of the prior processing method and the equipment cost; only need one of the modules needs to be replaced when the device is used each time; and the adopted overall structure is quite suitable to be carrier.

Published Chinese Patent Application No. CN 103385699 A provides a flexible resistance-type MEMS (micro-electro-mechanical systems) temperature sensor array and a preparation method thereof. The sensor array comprises a fixed substrate, a flexible substrate film, a temperature sensitive film, sensor electrodes, a flexible covering layer and electrical conductors. A preparation method for the sensor array comprises the following steps of forming a metal sacrificial layer on the upper surface of a fixed substrate material in a sputtering or thermal evaporation manner, performing spin coating on the sacrificial layer with PI (polyimide), preparing the temperature sensitive film, preparing sensor electrode arrays, preparing the covering layer PI film, imaging the covering layer PI film, peeling off flexible sensors and welding the electrical conductors. The sensor array provided by the disclosure has biocompatibility, stronger mechanical property, high-temperature resistance, high temperature impact resistance and higher ultrasonic propagation speed. Sizes and shapes of the sensitive film and sensor electrode points can be controlled by exposure, and the temperature field distribution of a skin surface can be measured in real time. The preparation method for the sensor array is simple and reliable and low in cost, and can be realized by adopting a micromachining process.

Published U.S. Patent Application No. 2011/312645 A1 relates to a microfluidic device for detecting target nucleic acid sequences in a sample, the microfluidic device having a supporting substrate, a microsystems technology (MST) layer overlying the supporting substrate for processing the sample, the MST layer having an array of hybridization chambers, each containing electro-chemiluminescent (ECL) probes for hybridization with the target nucleic acid sequences, and electrode pairs for receiving an electrical pulse, the ECL probes being configured to emit a photon of light when hybridized with one of the nucleic acid targets and activated by one of the electrodes, an array of temperature sensors positioned such that at least one of the temperature sensors corresponds to each of the hybridization chambers respectively, and, heaters for heating each of the hybridization chambers, such that, output from the temperature sensors is used for feedback control of the heaters.

Published U.S. patent application US 2014/367475 A1 discloses an electronic thermostat is described that includes a head unit, a rotatable ring, a backplate, an electronic display that is viewable by a user in front of the thermostat, a printed circuit board, and a daughter circuit. The daughter circuit is coupled to the printed circuit board, and senses motion of the rotatable ring and includes a first temperature sensor. A second temperature sensor separated from the first temperature sensor, are both used to calculate ambient temperature. The first temperature sensor is positioned at least partially within a cavity formed between a front surface of the head unit and the printed circuit board.

The publication by Deny Smith (Style Vanity, 27 Jul. 2021, p. 1-7) provides an overview for the PCB gold fingers which are responsible for establishing connections.

The publication "How to make a round PCB board within PCB design tools" which is available in the internet (https://www.pcbbuy.com/news/how-to-make-a-round-pcb-board-within-PCB-Design-Tools.html) relates to methods of making a round PCB.

Published European patent application EP 3 772 375 A1 relates to a system comprising a device or the device itself for measuring temperatures, comprising a sensor array plate, comprising on a first surface at least one temperature sensor arranged on at least one tongue that is surrounded by a cut-out leaving a bridge to the sensor array plate, wherein the at least one sensor has on both sides' spacer and a second surface opposite the first surface for connection to at least one operating plate of a member of an automated analyser system; and a pressure plate, comprising fins at the side for connection to the sensor array plate that align with the spacer of the sensor array plate when a pressure plate is arranged onto a sensor array plate.

For the calibration, verification, and evaluation of a thermocycler, it is of great advantage to determine the dynamic temperature curve very precisely and directly in the reaction center and to record it over time.

It is therefore the object of this disclosure to provide a measurement tool for ensuring a reliable and accurate measurement of accuracy and homogeneity in devices where measuring and monitoring of temperature changes is required like thermocycler or incubator.

SUMMARY OF THE DISCLOSURE

The present disclosure provides A device for measuring a temperature, comprising a circular printed circuit board comprising a circular inner material comprising a controller, a power supply and a transmitter, and an outer material which is arranged radially around the circular inner material, wherein the outer material comprises a plurality of tongues which are radially arranged around the inner material; and a plurality of thermal sensors surrounding an outer circumference of the circuit board, wherein each tongue of the plurality of tongues comprises at least one thermal sensor which is arranged on the upper surface of the respective tongue of the plurality of tongues.

The device according to the present disclosure may further comprise a double T-shaped bridge is arranged in a tongue for thermally connecting the lower surface of the tongue to the upper surface of the tongue, and wherein each T-shaped bridge comprises at least one sensor which is arranged on the upper surface of the double T-shaped bridge.

The device according to the present disclosure may further comprise a power supply is rechargeable, wherein the power supply is a battery.

It is envisaged that the transmitter is a wireless transmitter.

It is intended the bride is made of metal.

Another aspect of the device according to the present disclosure relates to the outer material is thinner than the inner material.

The device according to the present disclosure may further an outer material that has a thickness of ≤0.2 mm and the inner material has a thickness in the range of 1 to 2 mm.

It is envisaged that the inner material has a centrally arranged hole, wherein the hole has recesses for receiving corresponding structures of an axis.

Still other aspects, features, and advantages of the present disclosure are readily apparent from the following detailed description, simply by illustrating preferable embodiments and implementations. The present disclosure is also capable of other and different embodiments and its several details can be modified in various obvious respects, all without departing from the spirit and scope of the present disclosure. Accordingly, the drawings and descriptions are to be regarded as illustrative in nature, and not as restrictive. Additional objects and advantages of the disclosure will be set forth in part in the description which follows and in part will be obvious from the description or may be learned by practice of the disclosure.

SUMMARY OF THE DRAWINGS

The disclosure will be described based on drawings. It will be understood that the embodiments and aspects of the disclosure described in the figures are only examples and do not limit the protective scope of the claims in any way. The disclosure is defined by the claims and their equivalents. It will be understood that features of one aspect or embodiment of the disclosure can be combined with a feature of a different aspect or aspects of other embodiments of the disclosure, in which:

DETAILED DESCRIPTION OF THE DISCLOSURE

Figure 1:
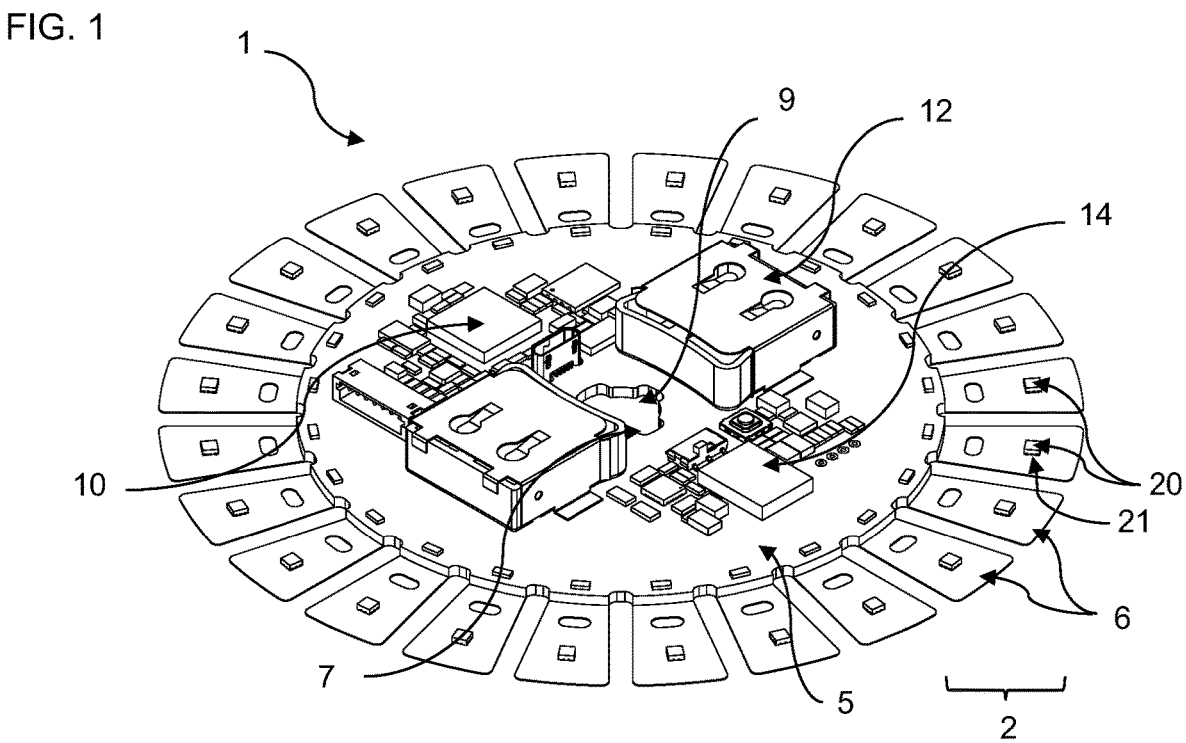
FIG. 1 shows a device 1 with a thermally optimized PCB design for measuring the temperature.

The technical problem is solved by the independent claims. The dependent claims cover further specific embodiments of the disclosure.

The present disclosure provides a device, like a data logger for temperature measurement in a thermal cycler, which is similar in geometry to the respective consumable suitable for receiving the samples which are to be thermally cycled. The device according to the present disclosure is inserted into the device instead of the consumable.

The device according to the present disclosure comprises elements for measuring temperature changes in a planar or 3-dimensional carrier component. The device has in a preferred embodiment a disc-shape.

The elements of the device comprise a plurality of thermos-sensors, a controller, and a transmitter for transmitting the data from the thermos-sensors in real-time. The number of the thermos-sensors can correlate to the number of positions in a consumable for receiving samples to be cycled, but this correlation is not compulsory for solving the technical problem. In embodiments of a device according to the present disclosure, 8 or 96 wells may be present which may correlate in the end to the number and positions of the sensors. In the end, the device according to the present disclosure is intended to receive data for monitoring reliably a homogenous distribution of the temperature of a metal ring or a surface intended for transferring temperature changes to a container comprising the sample to be cycled. A number of 24 sensors appears to be advantageous with respect to costs and the amount of required data for a reliable monitoring, independent from the number of positions for a container.

A printed circuit board (PCB) structure substitutes the chip or disc for the consumables. The electronic elements comprising the controller, the transmitter and the power supply like a rechargeable battery are arranged onto the PCB.

The replacement of a consumable with samples with a device according to the present disclosure allows the determination of static and dynamic temperature profiles in a place configured for cycling samples of a sample carrier. The device allows to monitor a homogeneous temperature distribution for all possible samples of a disc-shaped consumable. The required temperature changes for biological processes in the cycler can thus be determined and calibrated or adjusted very precisely across all reaction centres for samples.

The device comprises a precise, digital or analogue temperature sensor at the outer circumference of the disc-shaped device. The device is inserted into the reaction centre for a disc-shaped consumable to measure the temperature very realistically. The electrical and mechanical interface of the sensor to the actual sample carrier is optimized with respect to a. The number of sensors in view of the number of positions for container.
b. Very low thermal mass of the structure in the area of the sensors.
c. Very good thermal conductivity.
d. Low air resistance (necessary for moving consumables, e.g. rotating disc)

A further aspect of the disclosure is the possibility of transmitting and evaluating data in real time via a wireless transmission by the transmitter.

FIG. 1 shows a device 1 with a thermally optimized printed circuit board (PCB) design for measuring the temperature applied to a sample container with a direct thermal connection and resulting low offset. The device 1 comprises an outer carrier material 2 in the area of the sensors 20 which is significantly thinner with a maximal thickness of ≤0.2 mm than the circular inner carrier material 5 comprising the electronic elements having a thickness in the range of 1 to 2 mm. The outer carrier material 2 may be formed as tongues 6 with each tongue 6 comprising a sensor 20.

The circular-shaped centrally inner carrier material 5 5 has a central hole 7 which serves for fixing the device on an axis of a thermocycler. Recesses 9 of hole 7 serve for engaging into corresponding structures of the axis of a thermocycler for rotating the device.

A controller 10, a power supply 12 like a rechargeable battery and a transmitter 14 are arranged on the inner carrier material 5. The sensors 20 belong to a thinner outer carrier material 2 which surrounds the inner carrier material 5 radially. The sensors 20 are mounted onto a bridge 21 which goes through the outer material 2 of a tongue 6. The bridge 21 must be made of a material with a highly efficient thermal conductivity for transferring the temperature of a heating or cooling surface below a tongue to the sensor which is located above the upper surface of a tongue 6. The sensors may further be arranged on positions correlating to the positions of the samples in container during thermocycling.

Figure 2:
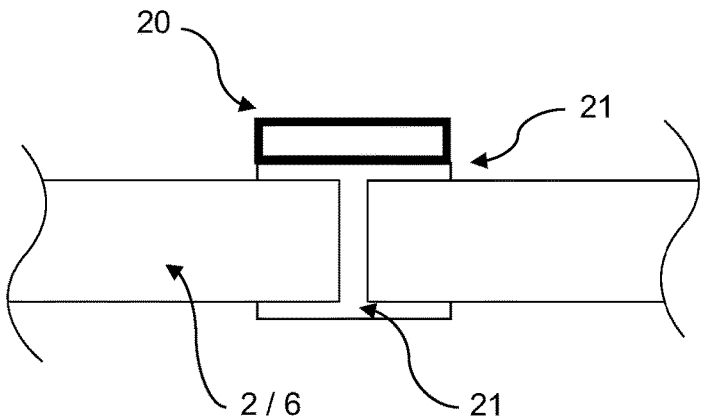
FIG. 2 shows a sectional view through a sensor.

FIG. 2 shows a sectional view through the outer material 2 which may be formed as a tongue 6. The sensor 20 may be arranged on a bridge 21 which is made of material with a good thermal conductivity like a metal. The surface for heating or cooling of samples in container (not shown) is located below bridge 21. Changes of the temperature of said surface for heating or cooling—which can be a ring arranged below the ring of tongues 6 (comp. FIG. 1)—will be transferred through bridge 21 to sensor 20 ensuring a direct and thus fast and reliable transfer of temperatures changes.

The advantages of the disclosure relate to minimising measurement errors, such as:

Static and dynamic measurement deviations due to an increased thermal mass.

Cooling by convection currents of the surrounding air in the area of the measuring sensors.

This enables a precise determination of the static and dynamic temperature profiles of the sample carrier and the homogeneity required for the respective biological processes over all reaction centres in order to calibrate and adjust the thermocycler.

Alternative approaches relate the use of a high speed IR camera. Such a solution is related to the disadvantages of providing a metallic surface of the sample carrier which must be processed in order to achieve a high emission in the IR range so that a temperature measurement can be carried out. A paint or coating may be used, but Deviations in the coating or foil will be related to increased measurement deviations. The camera must image the entire object in order to determine the required homogeneity at the same time.

Finally, the dynamic behaviour must be read out from the images/movie, which makes this solution more complex than the use of a device according to the present disclosure.

The foregoing description of the preferred embodiment of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiment was chosen and described in order to explain the principles of the disclosure and its practical application to enable one skilled in the art to utilize the disclosure in various embodiments as are suited to the particular use contemplated. It is intended that the scope of the disclosure be defined by the claims appended hereto, and their equivalents. The entirety of each of the aforementioned documents is incorporated by reference herein.

REFERENCE NUMERALS 1 device
2 outer carrier material
5 inner carrier material
6 tongue
7 hole
9 recess
10 controller
12 power supply
14 transmitter
20 sensor
21 bridge

What is claimed is:

1. A device for measuring a temperature, comprising
a circular printed circuit board comprising a circular inner material comprising a controller, a power supply and a transmitter, and an outer material which is arranged radially around the circular inner material, wherein the outer material comprises a plurality of tongues which are radially arranged around the inner material; and
a plurality of thermal sensors surrounding an outer circumference of the circuit board, wherein each tongue of the plurality of tongues comprises at least one thermal sensor which is arranged on the upper surface of the respective tongue of the plurality of tongues.

2. The device of claim 1, wherein a double T-shaped bridge is arranged in a tongue for thermally connecting the lower surface of the tongue to the upper surface of the tongue, and wherein each T-shaped bridge comprises at least one sensor which is arranged on the upper surface of the double T-shaped bridge.

3. The device of claim 1, wherein the power supply is rechargeable.

4. The device of claim 1, wherein the power supply is a battery.

5. The device of claim 1, wherein the transmitter is a wireless transmitter.

6. The device of claim 1, wherein the bridge is made of metal.

7. The device of claim 1, wherein the outer material is thinner than the inner material.

8. The device of claim 7, wherein the outer material has a thickness of ≤0.2 mm and the inner material has a thickness in the range of 1 to 2 mm.

9. The device of claim 1, wherein the inner material has a centrally arranged hole.

10. The device of claim 9, wherein the hole has recesses for receiving corresponding structures of an axis.

* * * * *